(12) United States Patent
Peng et al.

(10) Patent No.: US 12,401,247 B2
(45) Date of Patent: Aug. 26, 2025

(54) ELECTRIC MOTOR WITH ASYMMETRIC-TURN WINDINGS AND A VEHICLE HAVING THE SAME

(71) Applicant: GM GLOBAL TECHNOLOGY OPERATIONS LLC, Detroit, MI (US)

(72) Inventors: Peng Peng, Columbus, OH (US); Lei Hao, Troy, MI (US); Suresh Gopalakrishnan, Troy, MI (US); Renato Amorim Torres, Pontiac, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 18/320,449

(22) Filed: May 19, 2023

(65) Prior Publication Data

US 2024/0388156 A1 Nov. 21, 2024

(51) Int. Cl.
| | |
|---|---|
| *H02K 3/28* | (2006.01) |
| *B60L 53/16* | (2019.01) |
| *B60L 53/22* | (2019.01) |
| *H02P 25/22* | (2006.01) |
| *H02P 27/06* | (2006.01) |

(52) U.S. Cl.
CPC .............. *H02K 3/28* (2013.01); *B60L 53/16* (2019.02); *B60L 53/22* (2019.02); *H02P 25/22* (2013.01); *H02P 27/06* (2013.01); *B60L 2210/40* (2013.01)

(58) Field of Classification Search
CPC . H02K 3/28; B60L 53/22; B60L 53/16; B60L 2210/40; H02P 25/22; H02P 27/06
See application file for complete search history.

(56) References Cited

U.S. PATENT DOCUMENTS

| | | | |
|---|---|---|---|
| 10,784,802 B2 * | 9/2020 | De Wergifosse | ...... H02K 17/42 |
| 11,890,958 B2 * | 2/2024 | Prasad | ................... H02M 7/219 |
| 2018/0166938 A1 * | 6/2018 | Mo | ........................... H02K 3/12 |
| 2021/0313854 A1 * | 10/2021 | Sedlak | ................... H02K 1/148 |
| 2022/0190664 A1 * | 6/2022 | Mandel | ................... H02K 3/522 |
| 2023/0261558 A1 * | 8/2023 | Gao | ....................... H02K 15/043 |
| | | | 310/208 |
| 2024/0250566 A1 * | 7/2024 | Hurka | ................... H02J 7/1423 |

FOREIGN PATENT DOCUMENTS

| | | | | |
|---|---|---|---|---|
| EP | 0393486 A1 | * | 10/1990 | |
| EP | 3006254 A1 | * | 4/2016 | .......... B60L 11/1803 |
| EP | 3101805 A1 | * | 12/2016 | .............. H02M 1/14 |
| WO | WO-2018050846 A1 | * | 3/2018 | |
| WO | WO-2022229270 A1 | * | 11/2022 | .............. B64D 27/24 |

\* cited by examiner

*Primary Examiner* — Jeremy A Luks
(74) *Attorney, Agent, or Firm* — CANTOR COLBURN LLP

(57) ABSTRACT

Embodiments include an electric motor having asymmetric-turn windings and a vehicle including the same. The electric motor includes a rotor and a stator having a first set of windings having a first number of turns and a second set of windings having a second number of turns that is different than the first number of turns. The first set of windings are galvanically isolated from the second set of windings.

18 Claims, 7 Drawing Sheets

ELECTRIC MOTOR WITH ASYMMETRIC-TURN WINDINGS AND A VEHICLE HAVING THE SAME

INTRODUCTION

The subject disclosure relates to electric motors. In particular, the invention relates to electric motors having asymmetric-turn windings.

Electric motors can generally be described as having a stator and a rotor. The stator is fixed in place and the rotor operates relative to the stator. In electric motors, the stator is typically a current-carrying component of an electric motor, which generates a magnetic field that interacts with the rotor. The rotor of the electric motor includes a magnetic rotor and the magnetic field generated by the stator is controlled to rotate the rotor.

The stator of an electric motor typically includes a series of steel laminations, which are stacked together and contain slots to hold copper wire windings. These windings are used to create a magnetic field that interacts with the magnetic field of the rotor to produce torque. The windings in the stator can be arranged in different ways depending on the specific type of motor. The most common arrangement is a three-phase winding, which comprises of three sets of windings that are spaced 120 degrees apart around the stator. Each set of windings is connected to a different phase of the power supply, which creates a rotating magnetic field when the motor is energized. In a three-phase motor, the windings are typically made up of coils of insulated copper wire. The number of turns in each coil, as well as the thickness of the wire, will depend on the specific motor design and the desired operating characteristics.

The windings in the stator are responsible for creating the magnetic field that interacts with the rotor to produce torque. When the motor is energized, the magnetic field in the stator begins to rotate, which causes the rotor to turn as well. The speed of the motor is determined by the frequency of the power supply and the number of poles in the stator winding.

In general, electric motors that are configured as propulsion motors have a relatively low number of turn windings to achieve high power density because the winding inductance (impedance) is proportional to the square of the winding turn number, (i.e., Inductance $\alpha$ (No. of Turns)$^2$). However, connecting this type of electric motor directly to an uncontrollable three-phase voltage source to charge the attached battery can result in a high induced current which can harm the drive system. Accordingly, additional power converters and transformers are traditionally placed between the winding and the power system to modulate the power, voltage, and current at a safe level. These additional power converters and transformers cause extra weight, size, complexity, and power loss.

SUMMARY

In one exemplary embodiment an electric motor is provided. The electric motor includes a rotor and a stator having a first set of windings having a first number of turns and a second set of windings having a second number of turns that is different than the first number of turns. The first set of windings are galvanically isolated from the second set of windings.

In addition to one or more of the features described herein, the first number of turns is at least five times greater than the second number of turns.

In addition to one or more of the features described herein, the stator includes a plurality of slots and wherein each of the plurality of slots includes at least a portion of the first set of windings and the second set of windings.

In addition to one or more of the features described herein, the stator further includes a third set of windings having a third number of turns that is different that the first number of turns.

In addition to one or more of the features described herein, the third number of turns is equal to the second number of turns.

In addition to one or more of the features described herein, the second set of windings has a phase shift from the third set of windings.

In one exemplary embodiment a vehicle is provided. The vehicle includes a battery and an electric motor. The electric motor includes a rotor and a stator having a first set of windings having a first number of turns and a second set of windings having a second number of turns that is different than the first number of turns, wherein the first set of windings are galvanically isolated from the second set of windings. The electric motor also includes a first inverter coupled to the battery and the first set of winding and a second inverter coupled to the battery and the second set of windings.

In addition to one or more of the features described herein, the vehicle also includes a charging port configured to connect the vehicle to a high-voltage source/load.

In addition to one or more of the features described herein, the vehicle also includes one or more switches configured to selectively connect the first set of windings directly to one of the high-voltage source/load and the first inverter.

In addition to one or more of the features described herein, a ratio of the first turn number to the second turn number is based at least in part on a voltage level of the battery and a voltage level of the high-voltage source/load.

In addition to one or more of the features described herein, the high-voltage source/load is one of a power grid, another vehicle, and a home.

In addition to one or more of the features described herein, the first inverter is configured to convert direct current power from the battery into alternating current power supplied to the first set of windings.

In addition to one or more of the features described herein, the second inverter is configured to convert direct current power from the battery into alternating current power supplied to the second set of windings.

In addition to one or more of the features described herein, the first number of turns is at least five times greater than the second number of turns.

In addition to one or more of the features described herein, the stator includes a plurality of slots and wherein each slot includes at least a portion of the first set of windings and the second set of windings.

In addition to one or more of the features described herein, both the first set of windings and the second set of windings are connected to the battery to provide propulsion to the vehicle based on a determination that a speed of the vehicle is less than a threshold speed.

In addition to one or more of the features described herein, the first set of windings are connected to the battery to provide propulsion to the vehicle and the second set of windings are isolated from the battery based on a determination that a speed of the vehicle is greater than a threshold speed.

In addition to one or more of the features described herein, the second set of windings are isolated from the battery using one or more switches disposed between the second set of windings and the second inverter.

In addition to one or more of the features described herein, the second set of windings are isolated from the battery using a switch disposed between the battery and the second inverter.

In one exemplary embodiment a vehicle is provided. The vehicle includes a battery and an electric motor. The electric motor includes a rotor and a stator. The stator includes a plurality of slots, a first set of windings having a first number of turns, and a second set of windings having a second number of turns that is different than the first number of turns. The first set of windings are galvanically isolated from the second set of windings and wherein each of the plurality of slots includes at least a portion of the first set of windings and the second set of windings. The vehicle also includes a first inverter coupled to the battery and the first set of winding, a second inverter coupled to the battery and the second set of windings, and a charging port configured to connect the vehicle to a high-voltage source/load.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
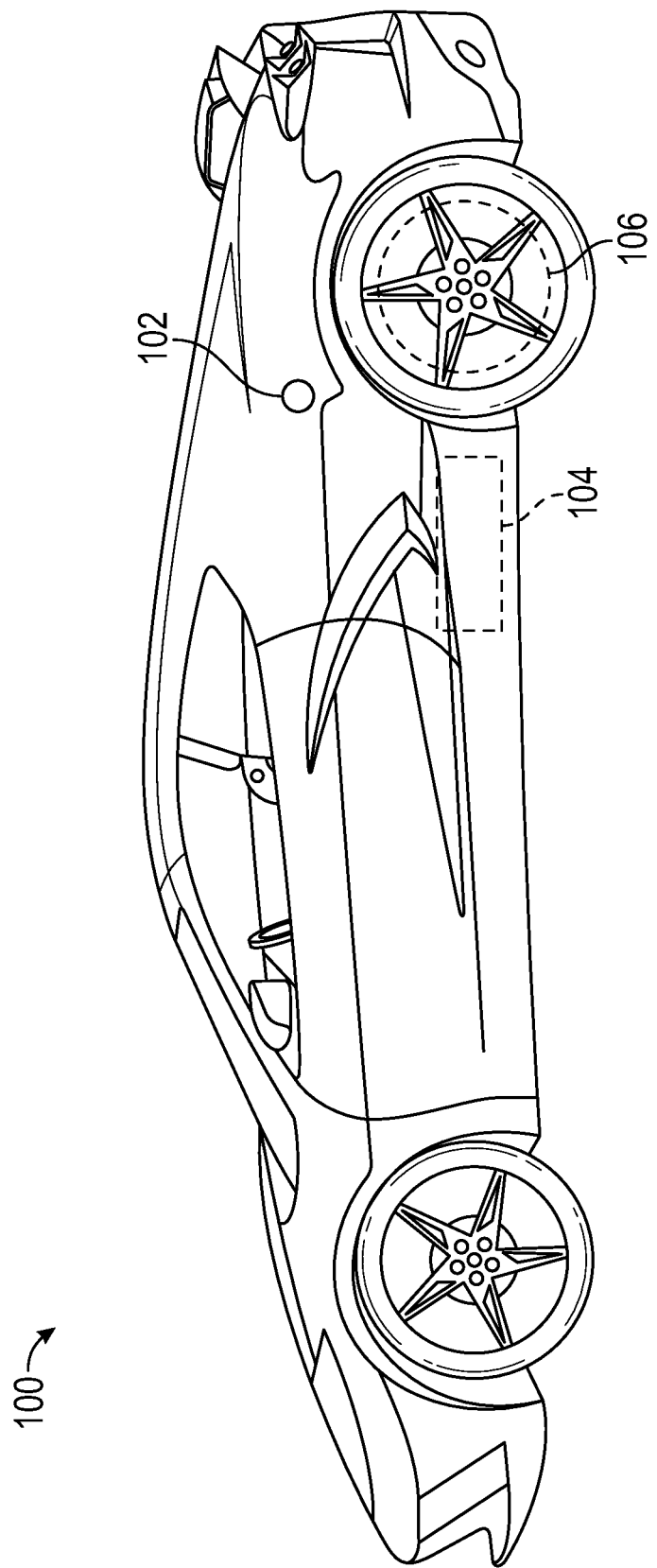
FIG. 1 is a schematic diagram of a vehicle for use in conjunction with one or more embodiments of the present disclosure.

The following description is merely exemplary in nature and is not intended to limit the present disclosure, its application or uses. It should be understood that throughout the drawings, corresponding reference numerals indicate like or corresponding parts and features.

In accordance with an exemplary embodiment, an electric motor is provided that includes multiple sets of windings that are asymmetric, (i.e., the different sets of windings have a different number of turns). In exemplary embodiments, the electric motor includes two or more sets of multiphase windings that are galvanically isolated. The number of turns of each set of winding is different and therefore the electromagnetic properties of the sets of windings are different. As a result, the electric motor can be used for various functions in addition to providing propulsion. For example, the electric motor can be used to perform bidirectional direct-grid-tied power transfer, vehicle-to-grid (V2G) power transfer, grid-to-vehicle (G2V) power transfer, vehicle-to-house (V2H) power transfer, vehicle-to-vehicle (V2V) power transfer, and improved low-speed torque propulsion.

Referring now to FIG. 1, a schematic diagram of a vehicle 100 for use in conjunction with one or more embodiments of the present disclosure is shown. The vehicle 100 includes a charging port 102, a battery 104, and an electric motor 106. In one embodiment, the vehicle 100 is a hybrid vehicle that utilizes both an internal combustion engine and an electric motor. In another embodiment, the vehicle 100 is an electric vehicle that only utilizes electric motors. In exemplary embodiments, the vehicle 100 is configured to be connected, via charging port 102, to a high-voltage power source (i.e., a voltage source of at least 200 volts (V)), which is used to charge the battery 104. The electric motor 106 is configured to receive power from the battery 104 to provide propulsion for the vehicle 100. In exemplary embodiments, the battery 104 is configured to supply direct-current (DC) power to an inverter (not shown), which converts the DC power into three-phase alternating-current (AC) power. The three-phase AC power is supplied to the electric motor 106 to propulsion for the vehicle 100.

Figure 2:
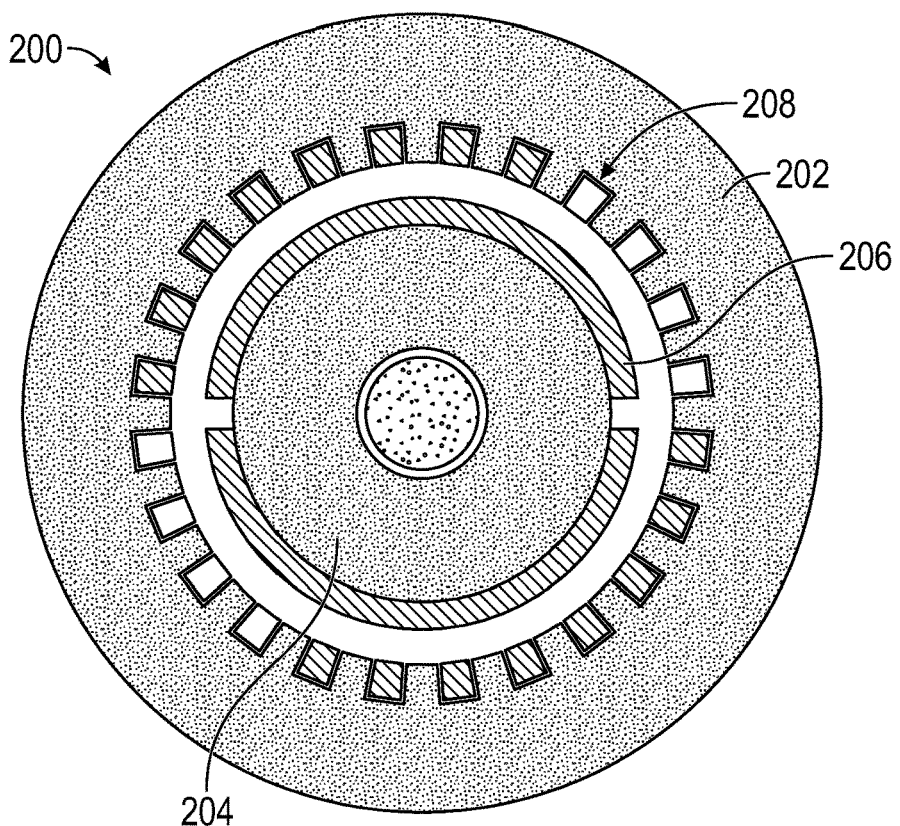
FIG. 2 is a schematic diagram of an electric motor for use in conjunction with one or more embodiments of the present disclosure.

Referring now to FIG. 2, a schematic diagram of an electric motor 200 for use in conjunction with one or more embodiments of the present disclosure is shown. As illustrated, the electric motor 200 includes a stator 202 and a rotor 204. The stator 202 includes one or more windings 208 that are configured to produce an electromagnetic field and the rotor 204 includes one or more magnets 206 that are configured to interact with the electromagnetic field produced by the windings 208.

Figure 3:
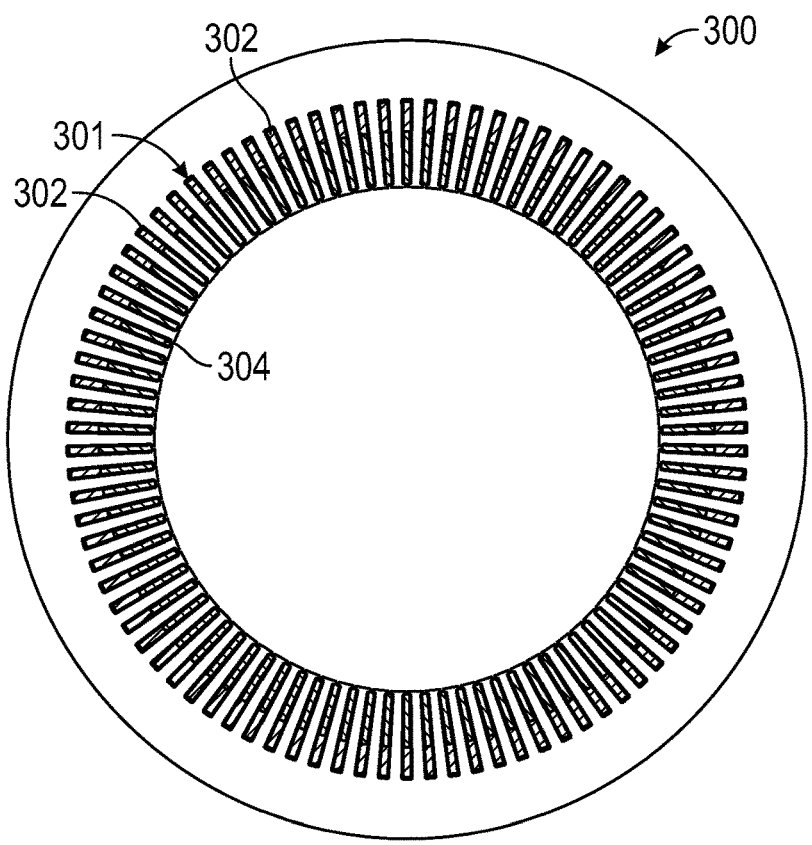
FIG. 3 is a schematic diagram of a stator of an electric motor in accordance with one or more embodiments of the present disclosure.

Referring now to FIG. 3, a schematic diagram of a stator 300 of an electric motor in accordance with one or more embodiments of the present disclosure is shown. As illustrated, the stator 300 includes a plurality of slots 301, a first set of multiphase windings 302, and a second set of multiphase windings 304. In exemplary embodiments, the first set of multiphase windings 302 is asymmetric from the second set of multiphase windings 304 (i.e., the different sets of windings have a different number of turns). In exemplary embodiments, the first set of multiphase windings 302 has a number of turn windings that is greater than the number of turn windings in the second set of multiphase windings 304. In one embodiment, the first set of multiphase windings 302 has a number of turn windings that is at least five times greater than the number of turn windings in the second set of multiphase windings 304.

In exemplary embodiments, a number of turn windings is defined as: For example, a high turn number can be achieved by increasing the number of $$\text{No. of Turns} = \frac{N_{cond} \times N_{slot} \times N_{pp}}{N_{par}},$$

where
 $N_{cond}$ is a number of conductors per slot;
 $N_{slot}$ is a number of slots per pole per phase;
 $N_{pp}$ is a number of pole pairs; and
 $N_{par}$ is a number of parallel branches.
conductors per slot ($N_{cond}$), increasing the number of slots per pole per phase ($N_{slot}$), and/or reducing the number of parallel branches ($N_{par}$). Likewise, a low turn number can be achieved by reducing the number of conductors per slot ($N_{cond}$), reducing the number of slots per pole per phase ($N_{slot}$), and/or increasing number of parallel branches ($N_{par}$).

In exemplary embodiments, the two sets of windings act as an isolated alternating current (AC)/AC transformer and transform an AC voltage at one input to a different AC voltage at the output while providing electrical isolation between the input and output. In exemplary embodiments, the two sets of windings are wrapped around a common iron core and when an AC voltage is applied to one set of windings, it creates a magnetic field in the core, which in turn together with the rotating rotor induces a voltage in the second set of windings. The magnitude of the induced voltage in the second set of windings depends on the ratio of the number of turns in the first and second sets of windings. In exemplary embodiments, the first and second sets of windings are electrically isolated by physically separating the first and second sets of windings with an insulating material. This prevents any electrical current from flowing between the input and output, thus providing protection against electric shock and eliminating ground loops.

Figure 4:
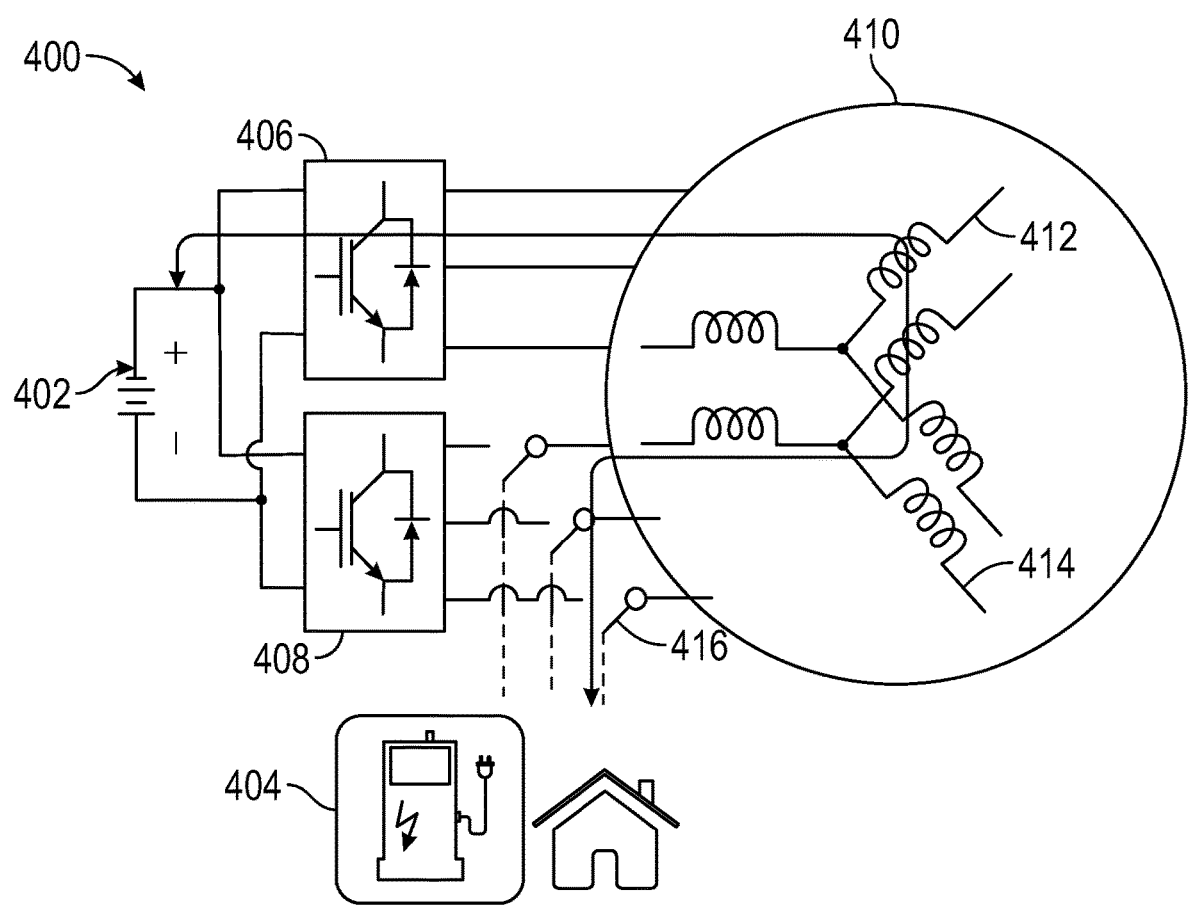
FIG. 4 is a schematic diagram of a system including an electric motor having asymmetric windings in accordance with one or more embodiments of the present disclosure.

Referring now to FIG. 4, a schematic diagram of a system 400 including an electric motor 410 having asymmetric windings in accordance with one or more embodiments of the present disclosure is shown. As illustrated, the system 400 includes a battery 402 that is configured to provide power to and receive power from an electric motor 410. The electric motor 410 includes a first set of windings 414, also referred to herein as a high-turn-number winding 414, and a second set of windings 412, also referred to herein as a low-turn-number winding 412, that have a different number of turns than the first set of windings 414. In one embodiment, the first set of windings 414 has a number of turn windings that is at least five times greater than the number of turn windings in the second set of multiphase windings 412. The first set of windings 414 and the second set of windings 412 are galvanically isolated from one another. The first set of turn windings 414 are selectively connected to one of the first inverter 408 and a high-voltage power source/load 404 by one or more switches 416. The second set of turn windings 412 are connected to a second inverter 406. The first inverter 408 and the second inverter 406 are configured to convert direct-current (DC) power utilized by the battery 402 into multiphase alternating-current (AC) power utilized by electric motor 410.

In exemplary embodiments, the electric motor 410 includes asymmetric turn windings and is configured to alleviate the need for a separate charger module as the electric motor 410 includes a second set of windings 414 that have a turn-number that is large enough to provide a high enough inductance to allow direct-grid-tied power transfer between the high-voltage power source/load 404 and the battery 402. In exemplary embodiments, the electric motor 410 is configured to support direct-grid-tie purposes, e.g., G2V and V2G. In one embodiment, the electric motor 410 is configured to use the battery 402 as a backup power source to supply energy to a home or to other loads. To supply high-voltage power to a home, the high-turn-number winding 414 is directly interfaced with a high-voltage source/load 404, such as a power grid, home power grid, or electric charging station, without additional power conversion components, e.g., power electronics, transformers.

In exemplary embodiments, the high-turn-number winding 414 is configured to work with a high-voltage three-phase energy source or a high-voltage single-phase energy source due to the high inductance of the high-turn-number winding 414. During power transfer between the battery 402 and the high-voltage source/load 404, the electric motor 410 operates as a transformer, and electrical energy/power transfers between the high-turn-number winding 414 and the low-turn-number winding 412. In exemplary embodiments, the voltage ratio between the two windings equals the winding turn ratio. In exemplary embodiments, the turn number of the low-turn number windings 412 is determined based on factors including the voltage of the battery 402, torque-speed-power requirement of the motor, etc., and the turn number of the high-turn winding 414 is mainly determined based on the voltage level of the high-voltage source/load 404). In addition, the ratio of the number of turns between the low-turn windings 412 and the high-turn winding 414 can be optimized based on the drive cycles, vehicle requirement, grid voltage, etc.

The high-turn-number winding's number is determined based on the voltage level (v) and frequency (f) of the power grid that the vehicle will be connected to such that the inductance (L) of the high-turn windings can allow a winding current i within the rated current range of the winding. In one example, the following equation can be used to roughly determine the desired inductance of the high-turn winding:

$$L = \frac{v}{2\pi f i},$$

where L is the desired winding inductance, v is the magnitude of external voltage source, f is the frequency of the external voltage source, i is the current of the high-turn winding. The turn number of the high-turn winding is designed accordingly.

Figure 5:
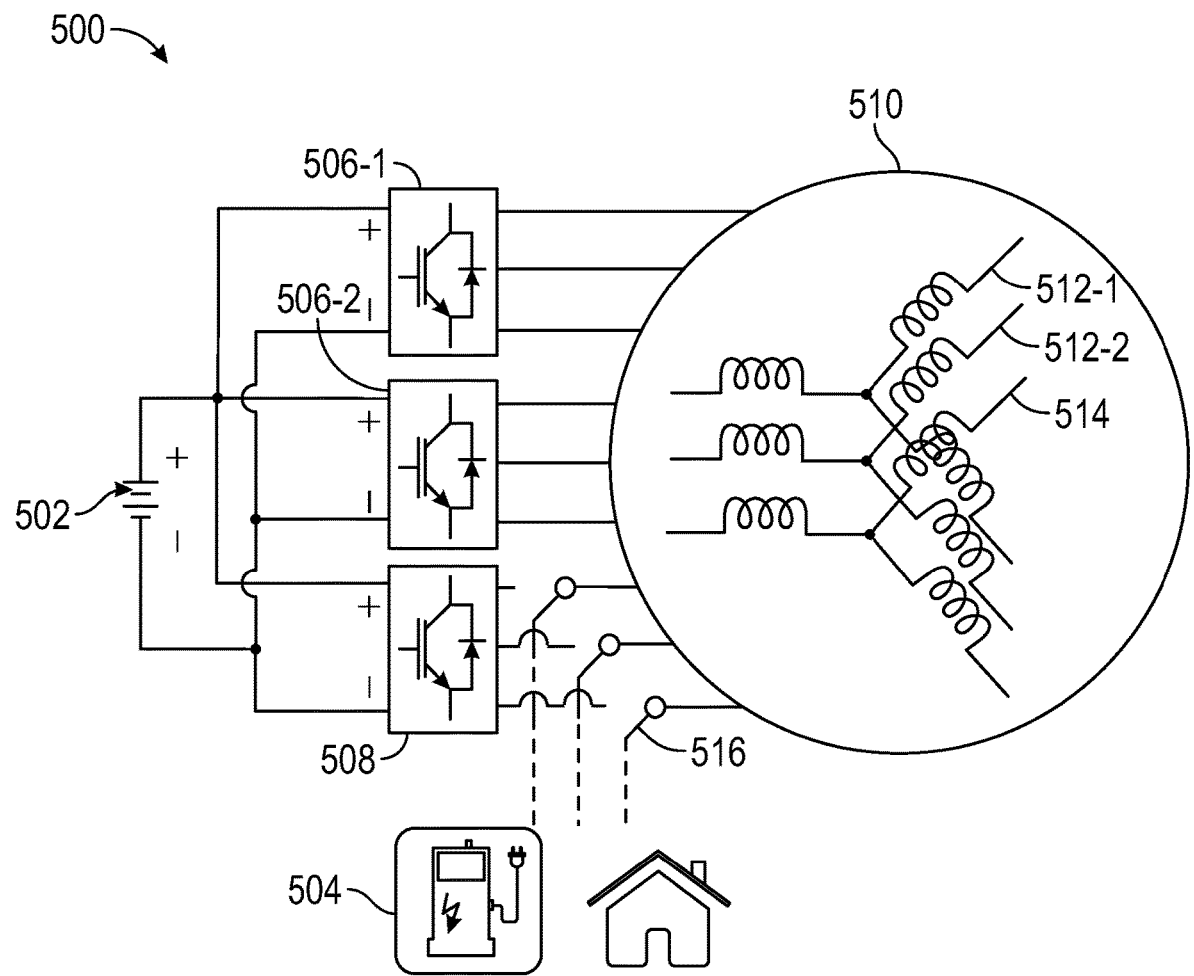
FIG. 5 is a schematic diagram of a system including an electric motor having asymmetric windings in accordance with one or more embodiments of the present disclosure.

Referring now to FIG. 5, a schematic diagram of a system 500 including an electric motor 510 having asymmetric windings in accordance with one or more embodiments of the present disclosure is shown. As illustrated, the system 500 includes a battery 502 that is configured to provide power to and receive power from an electric motor 510. The electric motor 510 includes a first set of windings 514, also referred to herein as a high-turn-number winding 514, a second set of windings 512-1, and a third set of windings 512-2, that have a different number of turns than the first set of windings 514. In one embodiment, the second set of windings 512-1 and the third set of windings 512-2 have the same number of turn windings. In one embodiment, the first set of windings 514 has a number of turn windings that is at least five times greater than the number of turn windings of the second set of multiphase windings 512-1 and the third set of turn windings 512-2. The first set of windings 514, the second set of windings 512-1, and the third set of windings 512-2 are galvanically isolated from one another. The first set of turn windings 514 are selectively connected to a first inverter 508 by one or more switches 516. The second set of turn windings 512-1 is connected to a second inverter 506-1 and the third set of turn windings 512-2 is connected to a second inverter 506-2. The first inverter 508, the second inverter 506-1, and the third inverter 506-2 are configured to convert direct-current (DC) power utilized by the battery 502 into multiphase alternating-current (AC) power utilized by electric motor 510. In exemplary embodiments, there is a phase shift between the second set of windings 512-1 and the third set of windings 512-2.

Figure 6:
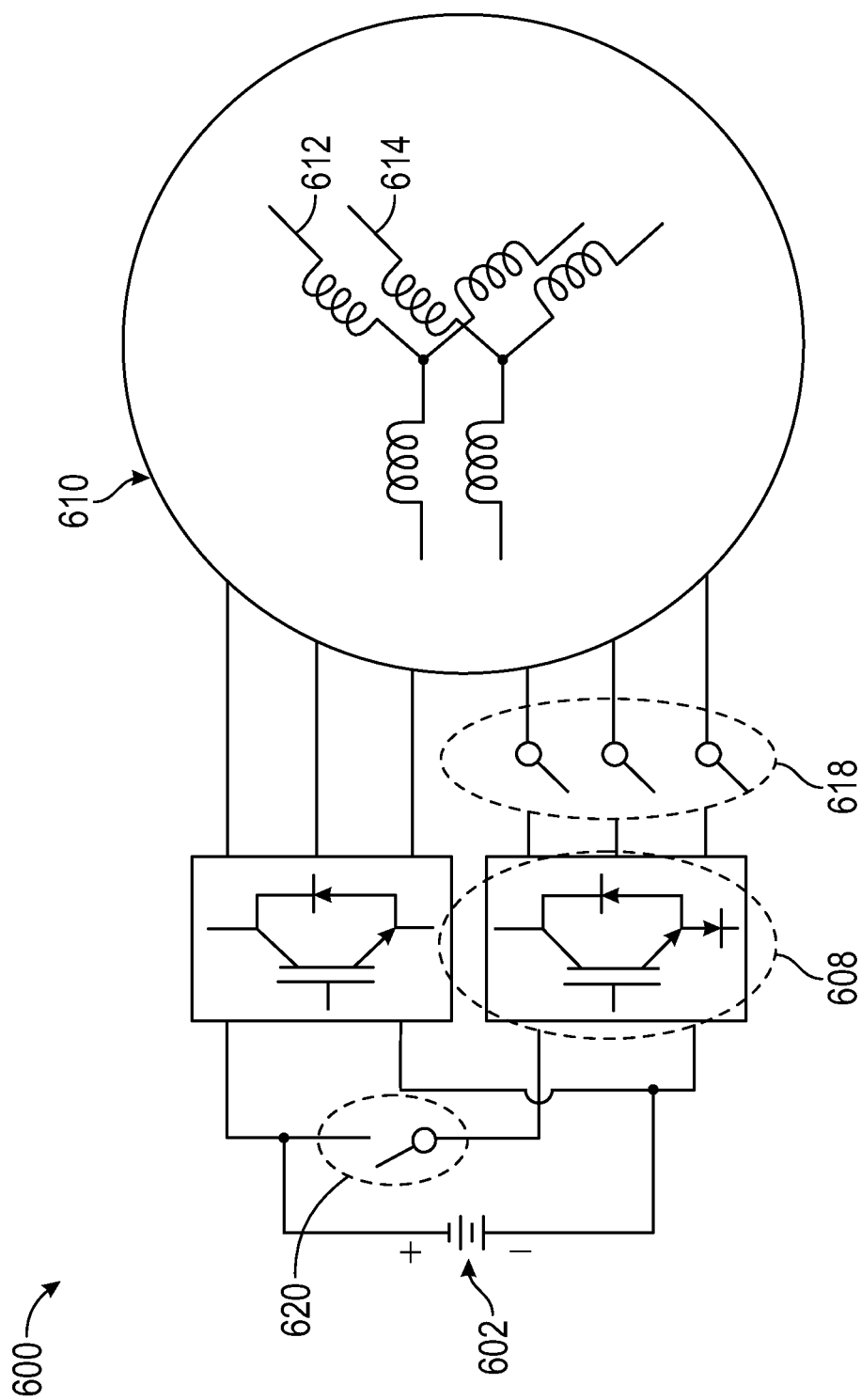
FIG. 6 is a schematic diagram of a system including an electric motor having asymmetric windings in accordance with one or more embodiments of the present disclosure.

Referring now to FIG. 6, a schematic diagram of a system 600 including an electric motor 610 having asymmetric windings in accordance with one or more embodiments of the present disclosure is shown. As illustrated, the system 600 includes a battery 602 that is configured to provide power to and receive power from an electric motor 610. The electric motor 610 includes a first set of windings 614, also referred to herein as a high-turn-number winding 614, and a second set of windings 612, also referred to herein as a low-turn-number winding 612, that have a different number of turns than the first set of windings 614.

In exemplary embodiments, the high-turn-number winding 614 are selectively connected to and disconnected from the battery 602 using various techniques. In one embodiment, the high-turn-number winding 614 are selectively connected to and disconnected from the battery 602 using a relay 620 located between the battery and the first inverter 608. In another embodiment, the high-turn-number winding 614 are selectively connected to and disconnected from the battery 602 using bidirectional switches that are disposed within the first inverter 608 to provide bidirectional voltage blocking capability. In a further embodiment, the high-turn-number winding 614 are selectively connected to and disconnected from the battery 602 using a plurality of relays 618 that are disposed between the first inverter and the electric motor 610.

Figure 7:
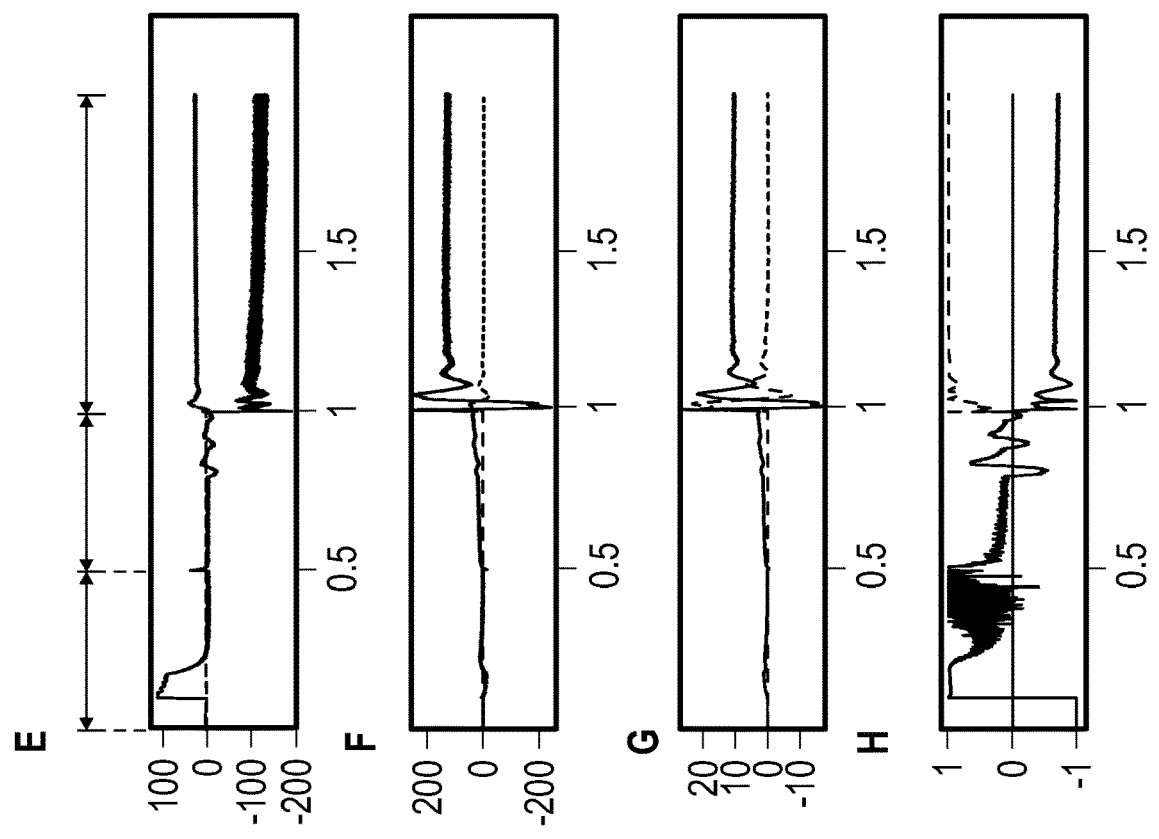
FIG. 7 depicts graphs illustrating the performance of an electric motor having asymmetric windings in accordance with one or more embodiments of the present disclosure.
Figure 7:
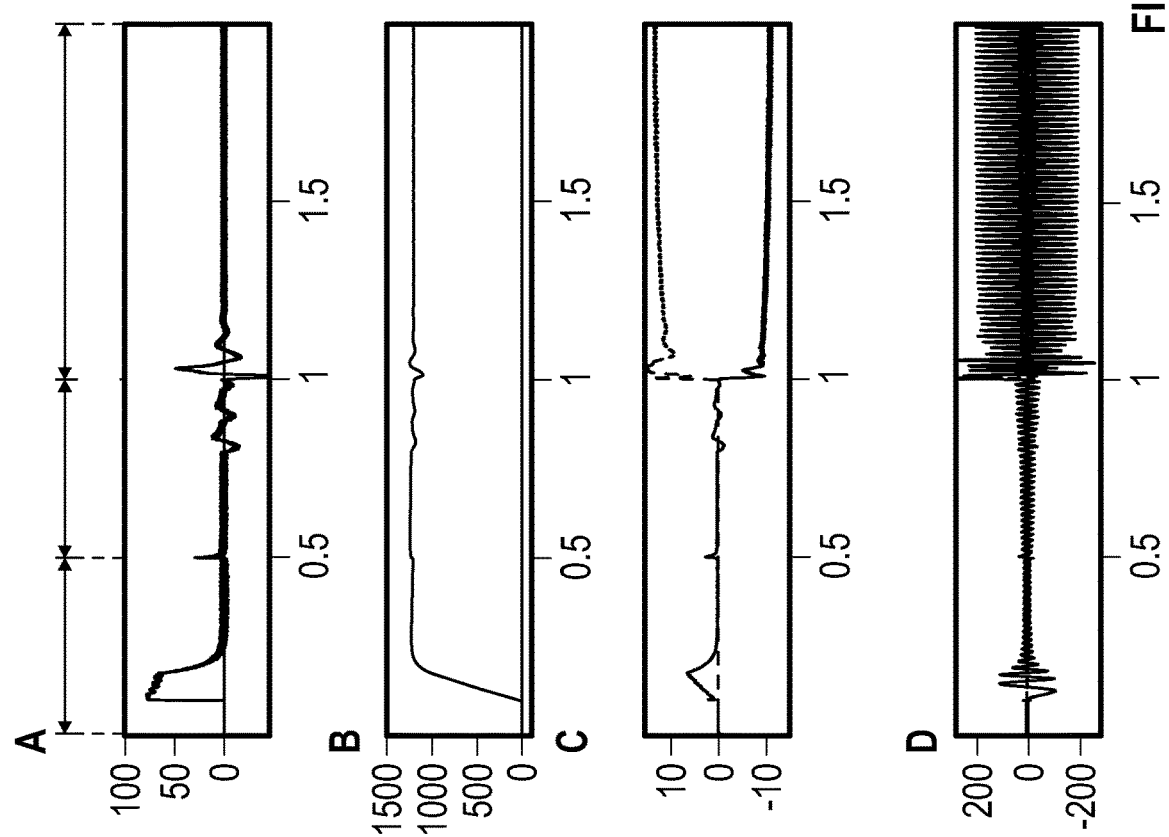

Referring now to FIG. 7, graphs demonstrating battery charging using an electric motor with asymmetric windings in accordance with one or more embodiments of the present disclosure are shown. In the depicted example, the electric motor having asymmetric windings is connected to a three-phase AC power grid that has a voltage of 230 Vrms. The charging procedure includes three steps that include speed ramp-up, voltage synchronization and battery charging. During speed ramp-up, the high-turn winding is disconnected from the power grid and the inverter controls the current in the low-turn winding. The electric machine operates in motoring mode and the motor speed increases until reaching the synchronous speed, (i.e., the speed where the motor frequency is synchronized with the frequency of the power system). During voltage synchronization mode, the high-turn winding is still disconnected from the power grid and the inverter controls the current in the low-turn winding in order to maintain the synchronous speed of the motor and at the same time induce back-emf in high-turn winding. The motor is controlled such that the magnitude, frequency and phase of the back-emf in high-turn winding are the same or at least very close to those of the power system. During battery charging mode, the high-turn winding is electrically connected to the power grid and the inverter is controlled so that high-turn winding consumes power from the power system as shown in graph C (active power). The low-turn winding delivers power to the battery as shown in graph C. Due to asymmetric turn number, the high-turn winding will have high voltage and low current, as shown in graph D (Phase-A current). The low-turn winding will have low voltage and high current as shown in in graph D. In the graphs the dashed lines correspond to the first set of windings and the sold lines refer to the second set of windings.

Figure 8A:
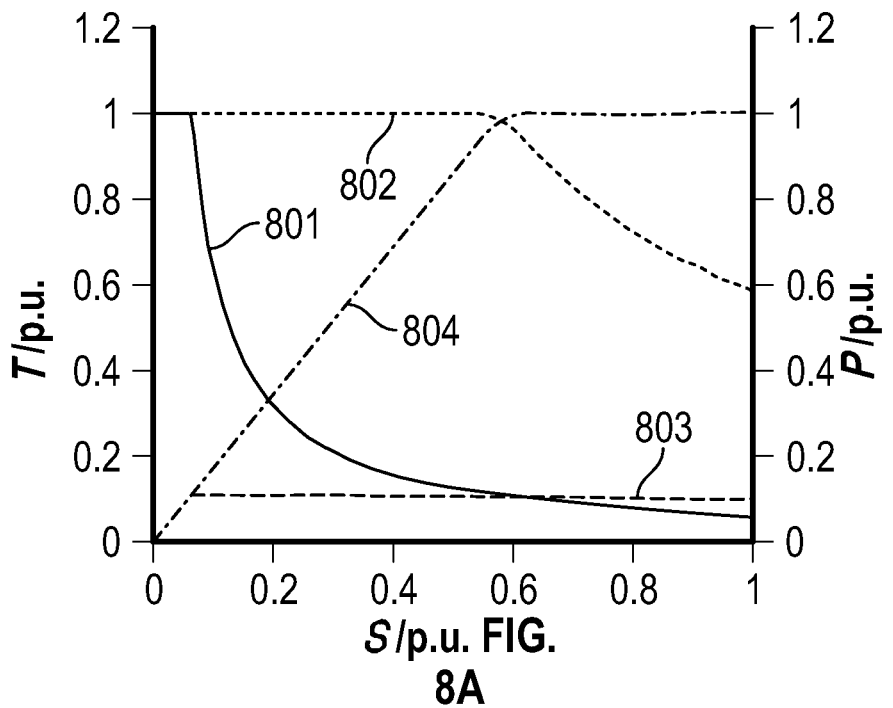
FIG. 8A is a graph illustrating the performance of an electric motor having asymmetric windings while utilizing only one set of the asymmetric windings in accordance with one or more embodiments of the present disclosure.

Referring now to FIG. 8A, a graph illustrating the performance of an electric motor having asymmetric windings while utilizing only one set of asymmetric windings in accordance with one or more embodiments of the present disclosure is shown. The graph illustrates the power (P), speed (S) and torque (T) per power unit (p.u). As illustrated by the graph, high-turn-number winding and low-turn-number windings have distinct electromagnetic properties. Namely, the current rating of the high-turn-number winding is less than the current rating of the low-turn-number winding, the inductance of the high-turn-number winding is greater than the inductance of the low-turn-number winding, the back electromotive force (back-EMF) of the high-turn-number winding is greater than back-EMF of the low-turn-number winding, and the power rating of the high-turn-number winding is less than the power rating of the low-turn-number winding. For electric propulsion, the low-turn-number winding provides a wide constant torque region 802, a high base speed, and a high-power output 804. In contrast, the high-turn number winding provides a narrow constant torque region 801, a low base speed 803, and less power output.

Figure 8B:
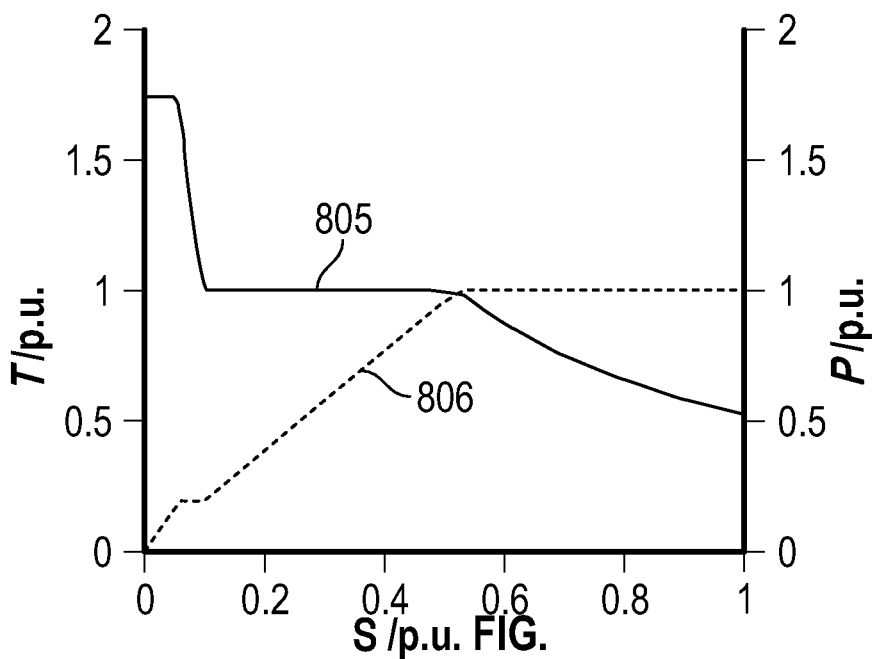
FIG. 8B is a graph illustrating the performance of an electric motor having asymmetric windings while utilizing both sets of asymmetric windings in accordance with one or more embodiments of the present disclosure.

Referring now to FIG. 8B, a graph illustrating the performance of an electric motor having asymmetric windings while utilizing both sets of asymmetric windings in accordance with one or more embodiments of the present disclosure is shown. The graph illustrates the power (P), speed (S) and torque (T) per power unit (p.u). As illustrated by the graph, both of the asymmetric-turn-windings contribute to propulsion. At low speeds, the high-turn-number winding 805 provides extra torque (i.e., traction) capability. At high speeds, the high-turn-number winding reaches the voltage limit, and therefore is isolated from the battery. In exemplary embodiments, only the low-turn-number windings 806 are used for propulsion at high speeds, i.e., speeds greater than a threshold speed. In exemplary embodiments, the threshold speed is determined based at least in part on the electromagnetic properties of the electric motor.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric motor comprising:
a rotor; and
a stator having a first set of windings having a first number of turns and a second set of windings having a second number of turns that is different than the first number of turns,
wherein the first set of windings are galvanically isolated from the second set of windings and wherein the first set of windings and the second set of windings are wrapped around a common iron core wherein when an AC voltage is applied to the first set of windings, a magnetic field is created in the common iron core, which in turn together with the rotating rotor induces a voltage in the second set of windings, wherein a magnitude of the induced voltage in the second set of windings is based on a ratio of the number of turns in the first and second sets of windings.

2. The electric motor of claim 1, wherein the first number of turns is at least five times greater than the second number of turns.

3. The electric motor of claim 1, wherein the stator includes a plurality of slots and wherein each of the plurality of slots includes at least a portion of the first set of windings and the second set of windings.

4. The electric motor of claim 1, wherein the stator further includes a third set of windings having a third number of turns that is different that the first number of turns.

5. The electric motor of claim 4, wherein the third number of turns is equal to the second number of turns.

6. The electric motor of claim 4, wherein the second set of windings has a phase shift from the third set of windings.

7. The electric motor of claim 1, wherein the first set of winding and the second set of windings are electrically isolated by physically separating the first set of winding and the second set of windings with an insulating material.

8. A vehicle comprising:
a battery;
an electric motor comprising:
a rotor; and
a stator having a first set of windings having a first number of turns and a second set of windings having a second number of turns that is different than the first number of turns, wherein the first set of windings are galvanically isolated from the second set of windings and wherein the first set of windings and the second set of windings are wrapped around a common iron core;
a first inverter coupled to the battery and the first set of winding; and
a second inverter coupled to the battery and the second set of windings,
wherein when a first voltage is applied to the first set of windings, a magnetic field is created in the common iron core, which in turn together with the rotating rotor induces a second voltage in the second set of windings, wherein a magnitude of the second voltage in the second set of windings is different from the first voltage and is determined based on a ratio of the number of turns in the first and second sets of windings.

9. The vehicle of claim 8, further comprising a charging port configured to connect the vehicle to a high-voltage source/load.

10. The vehicle of claim 9, wherein a ratio of the first number of turns to the second number of turns is based at least in part on a voltage level of the battery and a voltage level of the high-voltage source/load.

11. The vehicle of claim 9, wherein the high-voltage source/load is one of a power grid, another vehicle, and a home.

12. The vehicle of claim 8, wherein the first inverter is configured to convert direct current power from the battery into alternating current power supplied to the first set of windings.

13. The vehicle of claim 8, wherein the second inverter is configured to convert direct current power from the battery into alternating current power supplied to the second set of windings.

14. The vehicle of claim 8, wherein the first number of turns is at least five times greater than the second number of turns.

15. The vehicle of claim 8, wherein the stator includes a plurality of slots and wherein each slot includes at least a portion of the first set of windings and the second set of windings.

16. The vehicle of claim 8, wherein the second set of windings are isolated from the battery using one or more switches disposed between the second set of windings and the second inverter.

17. The vehicle of claim 8, wherein the second set of windings are isolated from the battery using a switch disposed between the battery and the second inverter.

18. A vehicle comprising:
a battery;
an electric motor comprising:
a rotor; and
a stator comprising:
a plurality of slots;
a first set of windings having a first number of turns; and
a second set of windings having a second number of turns that is different than the first number of turns,
wherein the first set of windings are galvanically isolated from the second set of windings and wherein each of the plurality of slots includes at least a portion of the first set of windings and the second set of windings and wherein the first set of windings and the second set of windings are wrapped around a common iron core;
a first inverter coupled to the battery and the first set of winding;
a second inverter coupled to the battery and the second set of windings; and
a charging port configured to connect the vehicle to a high-voltage source/load,
wherein when a first voltage is applied to the first set of windings, a magnetic field is created in the common iron core, which in turn together with the rotating rotor induces a second voltage in the second set of windings, wherein a magnitude of the second voltage in the second set of windings is different from the first voltage and is determined based on a ratio of the number of turns in the first and second sets of windings.

* * * * *